US012735950B2

(12) United States Patent
Smith et al.

(10) Patent No.: US 12,735,950 B2
(45) Date of Patent: Sep. 15, 2026

(54) ROCK STRAINING SYSTEM

(71) Applicant: Proppant Express Solutions, LLC, Denver, CO (US)

(72) Inventors: Kevin Watson Smith, Oklahoma City, OK (US); Mo Habayeb, Oklahoma City, OK (US)

(73) Assignee: Proppant Express Solutions, LLC, Denver, CO (US)

( * ) Notice: Subject to any disclaimer, the term of this patent is extended or adjusted under 35 U.S.C. 154(b) by 0 days.

(21) Appl. No.: 18/896,715

(22) Filed: Sep. 25, 2024

(65) Prior Publication Data

US 2025/0101821 A1 Mar. 27, 2025

Related U.S. Application Data

(60) Provisional application No. 63/585,822, filed on Sep. 27, 2023.

(51) Int. Cl.

| | |
|---|---|
| ***E21B 21/06*** | (2006.01) |
| ***B01D 29/35*** | (2006.01) |
| ***B01D 29/52*** | (2006.01) |
| ***B01D 29/96*** | (2006.01) |
| ***E21B 43/26*** | (2006.01) |

(52) U.S. Cl.

CPC ............ *E21B 21/065* (2013.01); *B01D 29/35* (2013.01); *B01D 29/52* (2013.01); *B01D 29/96* (2013.01); *E21B 43/2607* (2020.05)

(58) Field of Classification Search

CPC ... E21B 43/2607; E21B 21/065; B01D 29/52; B01D 29/96; B01D 29/35

See application file for complete search history.

(56) References Cited

U.S. PATENT DOCUMENTS

| | | | | | |
|---|---|---|---|---|---|
| 4,352,739 | A | * | 10/1982 | Oliver, Jr. | B01D 37/00 210/791 |
| 9,322,595 | B1 | | 4/2016 | Shinn | |
| 9,862,538 | B2 | | 1/2018 | Pham et al. | |
| 10,118,529 | B2 | | 11/2018 | Eiden, III et al. | |
| 10,711,778 | B2 | | 7/2020 | Buckley | |
| 10,989,018 | B2 | | 4/2021 | Oehler et al. | |
| 2013/0153234 | A1 | | 6/2013 | Bobier et al. | |

(Continued)

FOREIGN PATENT DOCUMENTS

| | | | | | |
|---|---|---|---|---|---|
| WO | WO-9932206 | A1 | * | 7/1999 | B01D 35/303 |
| WO | WO-0018487 | A1 | * | 4/2000 | B01D 29/54 |

*Primary Examiner* — Atif H Chaudry

(74) *Attorney, Agent, or Firm* — Haynes and Boone, LLP

(57) ABSTRACT

A straining system is provided to facilitate the removal of rocks and other debris from wet, unprocessed sand that is used as proppant during hydraulic fracturing operations which are well stimulation operations that are performed as an instrumentality for stimulation to achieve enhanced flow rates in and from wells, such as oil, gas, water, injection, or geothermal wells. The straining system has an intake manifold that is configured to accept frac fluid from a blender and a discharge manifold that is configured to discharge strained frac fluid to an array of frac pumps. An internal flow pathway places the intake manifold in fluidic communication with the discharge manifold. The flow pathway includes a strainer basket for the removal of debris that may be entrained in the frac fluid emanating from the blender.

20 Claims, 10 Drawing Sheets

(56) References Cited

U.S. PATENT DOCUMENTS

| | | | | |
|---|---|---|---|---|
| 2014/0318810 | A1* | 10/2014 | Lucas | E21B 43/02<br>166/381 |
| 2015/0122498 | A1* | 5/2015 | Duesel, Jr. | B01D 1/0058<br>166/305.1 |
| 2018/0361282 | A1* | 12/2018 | Thorat | B01D 35/30 |
| 2022/0316308 | A1 | 10/2022 | Arceneaux et al. | |

* cited by examiner

ROCK STRAINING SYSTEM

CROSS-REFERENCE TO RELATED APPLICATIONS

The present application claims benefit of priority to U.S. Provisional Patent Application No. 63/585,822 filed Sep. 27, 2023, entitled "Rock Straining System," the disclosure of which is hereby incorporated by reference in its entirety.

BACKGROUND

1. Field of the Invention

The presently disclosed instrumentalities pertain to the field of stimulating wells by the use of hydraulic pressure to fracture subterranean rock formations and, more particularly, to the use of surface equipment providing a slurry of liquid and sand or other proppant that is pumped downhole in a manner such that the proppant enters fractures in the rock once the fractures are created and holds the fractures open after the pumping operation ceases.

2. Description of the Related Art

Most wells that are stimulated by the technique of hydraulic fracturing utilize sand as proppant. The sand is conventionally mined from a naturally occurring source and subjected to a process of rotary screening and drying, for example, as described in U.S. Pat. No. 9,322,595 to Shinn. The sand is blended into a liquid component to form a slurry known as a "frac fluid" that may sometimes be viscosified to assist transport of the sand as described in U.S. Pat. No. 9,322,595 to Shinn. More often, however, the frac fluid is of the slickwater variety, which means that the liquid component has a low viscosity that performs more or less in the manner of a Newtonian fluid. Friction reducers may be added to the liquid component, as may viscosifiers in small amounts, together with scale inhibitors, surfactants and other materials known to those of ordinary skill in the art as described in United States Patent Publication No. 2013/0153234 to Bobier et al.

The sand is most often placed in containers at the mining site, loaded onto trucks, and driven to a remote location where a well has been drilled. The containers may be boxes that are placed in a conveyor system to dispense sand to a blender as described in U.S. Pat. No. 10,118,529 to Eiden, III et al. Other transport systems utilize silos as described in U.S. Pat. No. 9,862,538 to Pham et al. or belly dump trucks as described in United States Patent Publication No. 2022/0316308 to Arceneaux et al.

More recently, there has developed an interest in hauling wet sand to the well sites. The use of containers and special equipment for use with wet sand is described, for example, in U.S. Pat. No. 10,989,018 to Oehler et al. The use of wet sand advantageously avoids the time and expense of drying and sieving the sand, which may now be hauled wet from the mine without further processing after being removed from the ground. Because the wet sand is not sieved, there may exist such debris as rocks, wood, glass, trash, and other particulate matter. Any such debris having a dimension greater than about a quarter of an inch or even less may potentially interfere with the operation of a reciprocating frac pump that includes valves. These reciprocating frac pumps that include valves are described by way of example in U.S. Pat. No. 10,711,778 to Buckley.

U.S. Pat. No. 10,989,018 to Oehler et al recognizes the problem with debris in wet sand and proposes to remove the debris by use of a vibrator-actuated shaker screen. While constituting a significant advance in the art, the shaker screen concept is in practice associated with problems such as mesh breakage and overflow of sand at the mesh. Accordingly, there exists a need for a better solution for removing debris from wet sand.

BRIEF SUMMARY

The presently disclosed instrumentalities overcome the problems identified above and advance the art by providing a system for the removal of debris in wet sand that is used as proppant during the performance of a hydraulic fracturing operation. In embodiments, this is done by installing a straining system downstream of a frac fluid blender and ahead of an array of frac pumps.

According to one embodiment, the straining system includes a first plurality of intake valves in fluidic communication with an intake plenum. Each of the intake valves is moveable between a first intake valve position that is open to admit flow through the intake valve into the intake plenum and a second intake valve position that is closed to prevent flow through the intake valve into the intake plenum. A plurality of strainer tubes each have a rising section that contains a capped access port, an inlet, an outlet, and an internal flow pathway placing the inlet in fluidic communication with the outlet. The inlet is also in fluidic communication with the intake plenum. The flow pathway extends in a downstream direction from the inlet towards the outlet and through at least the rising section. The flow pathway includes a strainer hanger and a strainer basket located between the inlet and the outlet. A discharge manifold having a discharge plenum is in fluidic communication with each outlet of the strainer tube. Several discharge valves may be selectively opened and closed to govern flow of frac fluid from the discharge plenum.

In one embodiment, the intake valves may include a combination of intake valves having different internal diameters, such as four inch valves and eight inch valves.

In various embodiments, the rising sections of the strainer tubes rise at an angle ranging from 60° to 130° measured as a departure from horizontal. In other embodiments, the angle ranges from 90°+/−5° from horizontal. In still other embodiments, the angle is perpendicular to horizontal because this tends to mitigate the potential seizing of the strainer baskets that may otherwise happen due to sand compaction as the strainer baskets are being removed for maintenance. Moreover, each of the strainer tubes may be formed as an elbow having a horizontal section transitioning in the downstream direction from the rising section towards the discharge manifold. A gantry may be positioned above the discharge manifold and each one of the horizontal sections of the plurality of strainer tubes.

In one embodiment, the capped access port of each strainer tube may be located at an upper end of the rising section above the inlet. The capped access port has a cap that is selectively removable and the strainer basket has dimensions permitting passage of the strainer basket through the capped access port when the cap is removed for maintenance operations. Also, a system of clamps mounted proximate the capped access port may be used to exert a compressive force sealing the cap in position over the capped access port.

In various embodiments, an intake pressure gauge may be mounted on the intake manifold to sense an intake-side pressure therein. A discharge pressure gauge may then also be mounted on the discharge manifold to sense a discharge-side pressure therein such that subtracting the discharge-side pressure from the intake-side pressure determines a pressure drop across the plurality of strainer tubes. The pressure drop may be monitored to ascertain a need for system maintenance.

In one embodiment, the straining system may be constructed and arranged as a self-supporting or standalone unit mounted on a skid.

In various embodiments, each of the strainer hangers may be formed using at least one arcuate member with a radially outboard side welded to an interior diameter of the rising section. A radially inboard diameter of the arcuate member has sufficient dimensions to permit passage through the arcuate member of a corresponding one of the strainer baskets. The strainer basket may be provided with a collar of sufficient outer diameter to engage the arcuate member at a position upstream of the arcuate member for support of the strainer basket on the arcuate member. The arcuate member may be formed, for example, as a ring or flange that functions as a strainer basket hanger.

In various embodiments, each strainer basket may include a handle descending towards the collar described above and affixed thereto, the handle being configured for use in selectively lifting the strainer basket from the collar for maintenance of the strainer basket. The handle may have at least two elongate members extending below the collar and at least two support rings bridging the at least two elongate members in a horizontal plane perpendicular to an elongate axis of each elongate member. A screen may be provided to form a basket attached to the support rings. The screen has a mesh size that is effective for removing debris capable of interfering with operation of valves in a pump made for hydraulic fracturing. This mesh size may be, for example, ¼ inch or less and is preferably 3/16 inch or less. In some embodiments a lower wall formed of the screen may be provided with a conical section rising upwardly from a bottom portion tapering upwardly in an upstream direction towards the arcuate member.

DETAILED DESCRIPTION

There will now be shown and described, by way of non-limiting examples, various instrumentalities for overcoming the problems discussed above. In particular, the straining system described above is constructed for use in support of a hydraulic fracturing operation and facilitates the use of semi-processed or unprocessed sand as proppant. This sand may be, for example, newly mined sand that may be wet with ground water and/or sand that has not been screened and sorted by mesh size.

Figure 1:
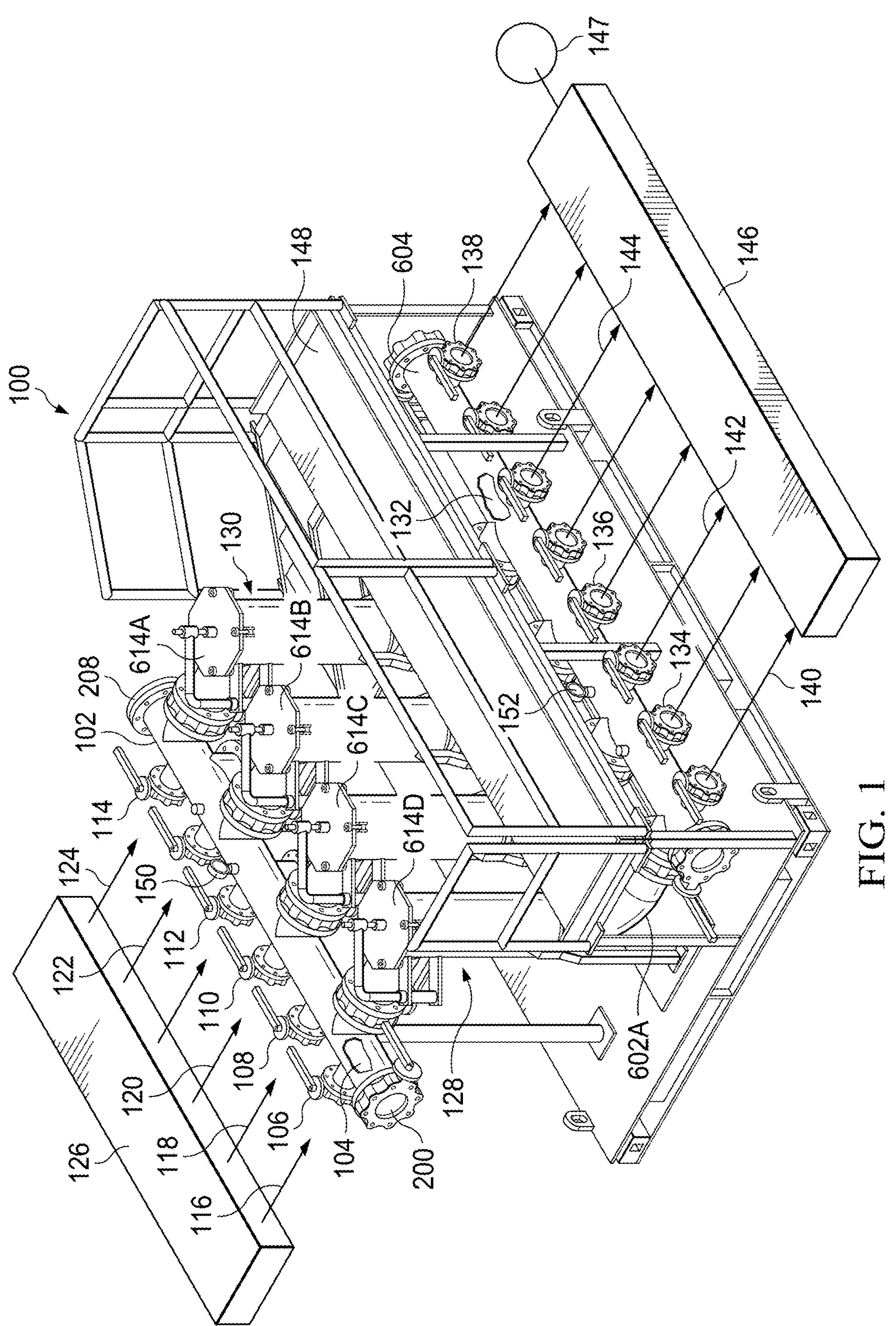
FIG. 1 shows a right, rear, top perspective view of a straining system according to one embodiment.
Figure 2:
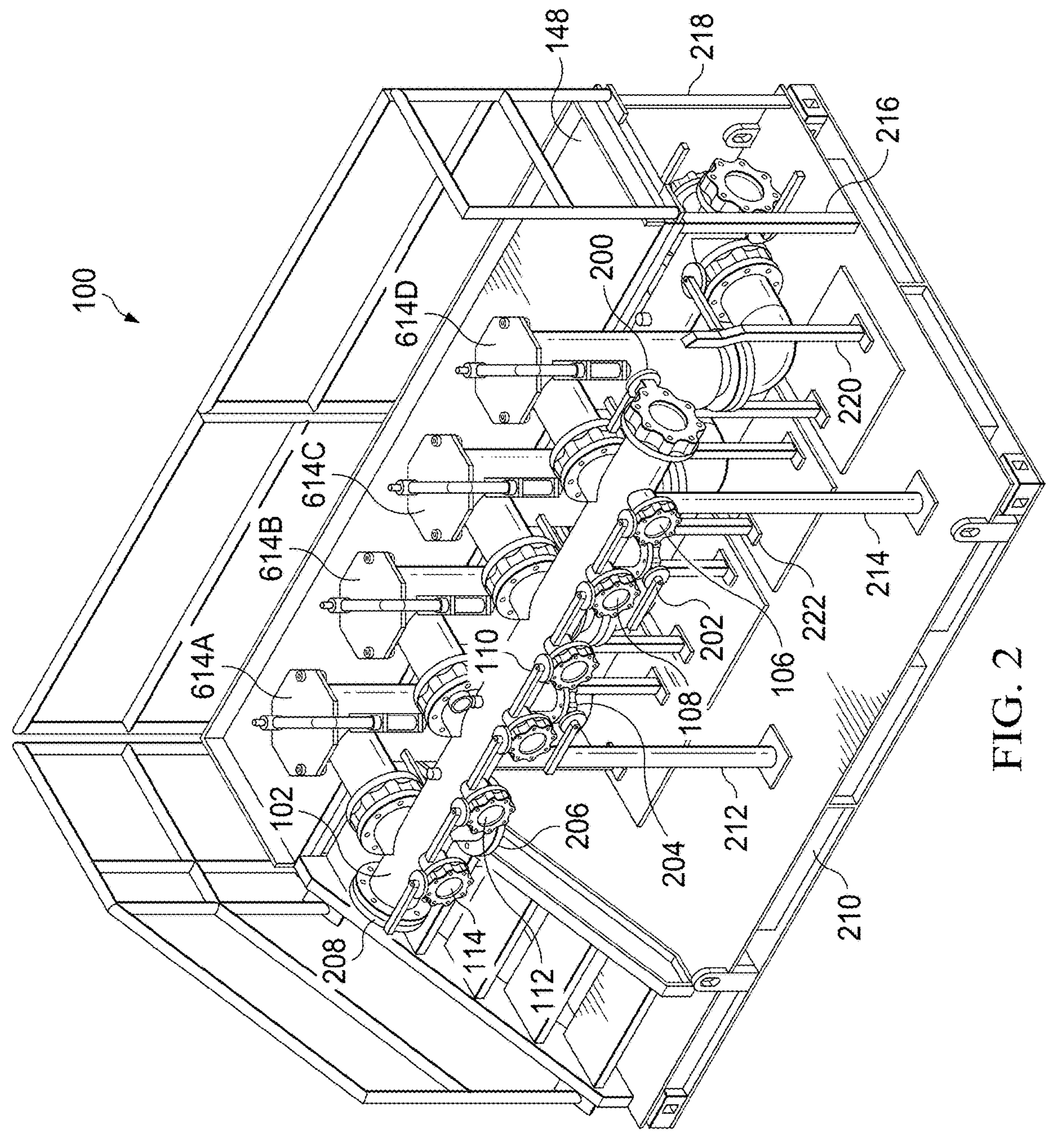
FIG. 2 shows a right, front, top perspective view of the straining system.
Figure 3:
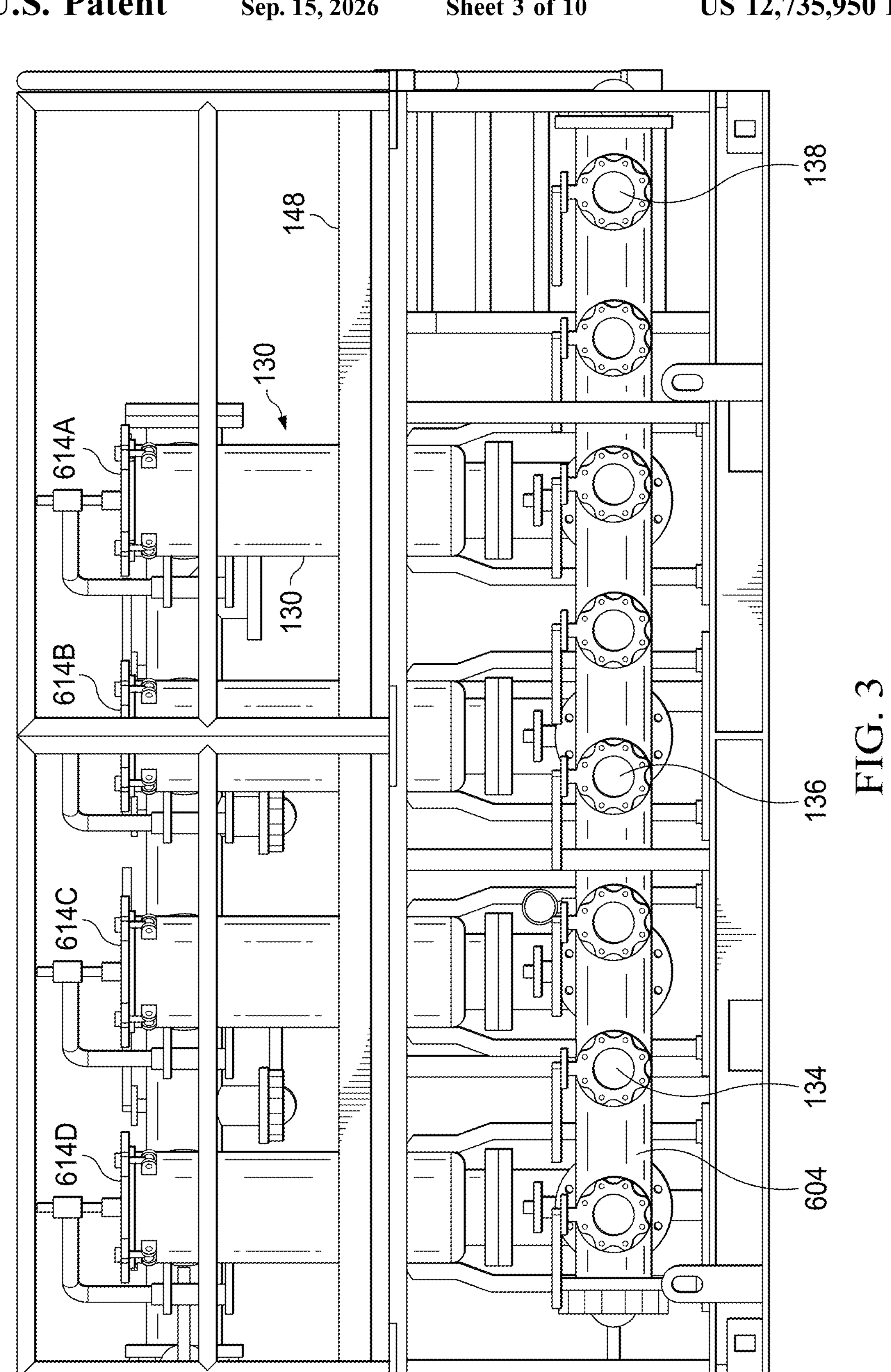
FIG. 3 shows a rear plan view of the straining system.
Figure 4:
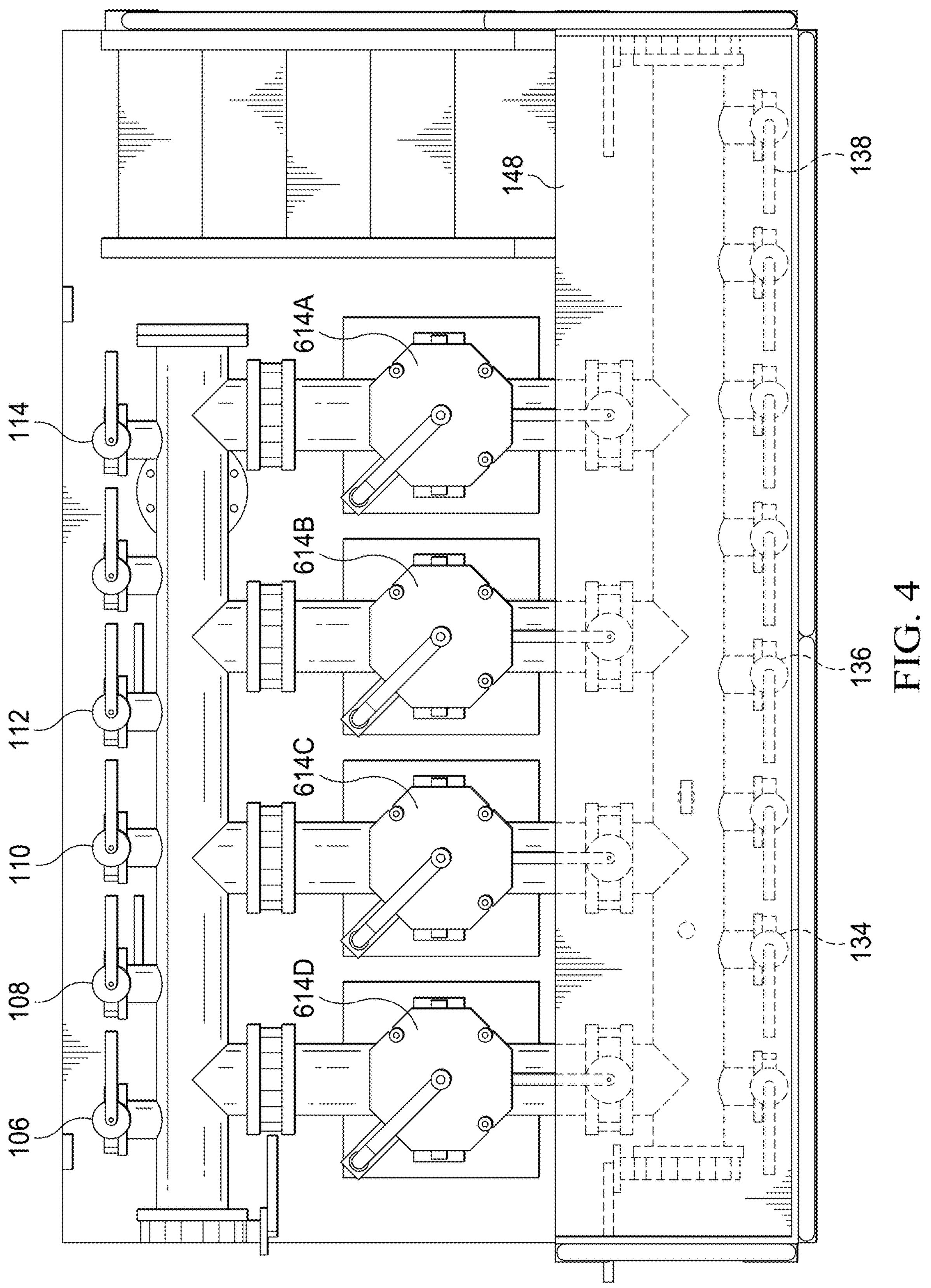
FIG. 4 shows a top plan view of the straining system.
Figure 5:
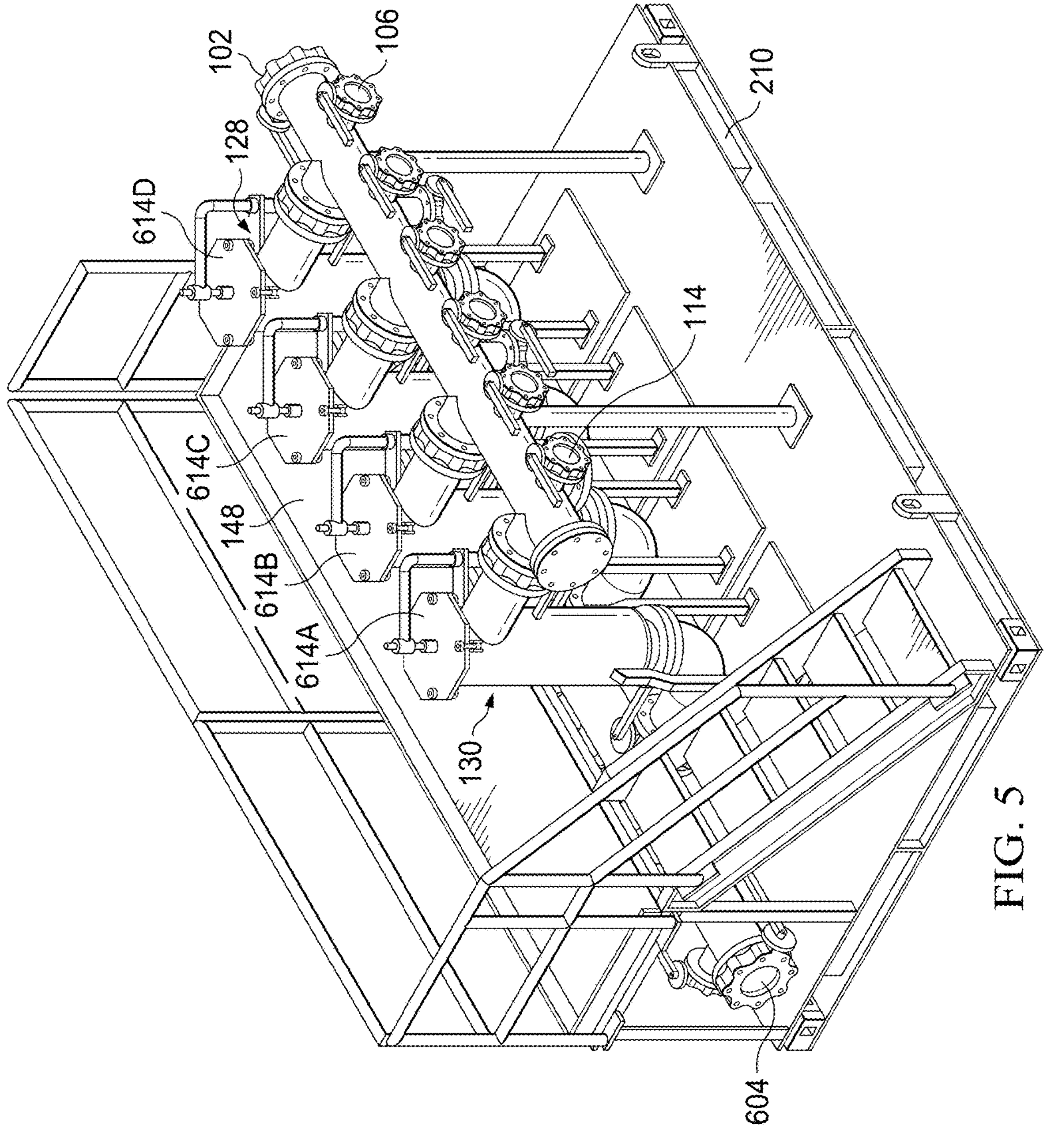
FIG. 5 shows a left, top, front perspective view of the straining system.

FIGS. 1 to 5 show a straining system 100 according to one embodiment. With emphasis on FIG. 1, The straining system 100 includes an intake manifold 102 having an intake plenum 104 therein and a set of flour-inch intake valves 106, 108, 110, 112, 114, which may be butterfly valves, each of which may be selectively opened and closed to place frac fluid flow streams 116, 118, 120, 122, 124 in fluidic communication with the intake plenum 104. In the intended environment of use, the frac fluid flow streams 116-124 are provided in lines emanating from a blender 126. In the intended environment of use, the flow streams 116-124 are at a blender discharge pressure that is, generally speaking, less than 100 psi, from 30 to 70 psi, or from 35 to 50 psi or another blender output pressure according to the design of any particular blender. As best seen in FIG. 2, the intake manifold 102 may have, in addition to the four inch intake valves 106-114, a set of eight-inch intake valves 200, 202, 204, 206, 208, which may also be opened and closed for control of fluidic communication between the blender 126 and the intake plenum 102. The use of butterfly valves having different diameters advantageously increases the number of rig-up options for performing hydraulic fracturing operations.

Figure 6:
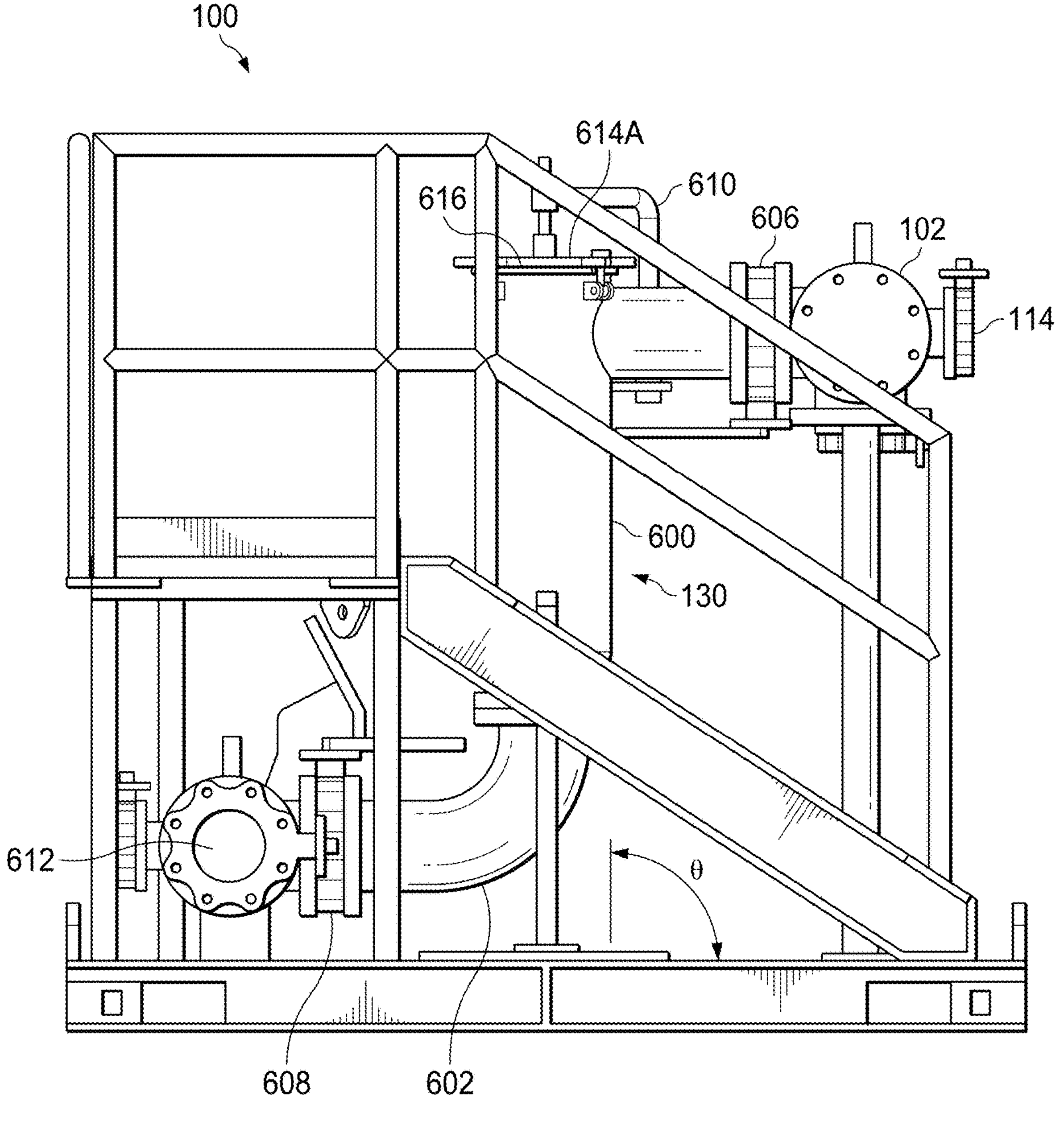
FIG. 6 shows a left side plan view of the straining system.

The intake plenum 104 discharges into a plurality of identical strainer tubes, such as strainer tubes 128, 130. As is best seen from FIG. 6, strainer tube 130 is shown by way of example representing all such strainer tubes and has a rising section 600 that rises from horizontal at an angle θ that is from 60° to 1300°, 90°+/−5°, or 90°. The relative steepness of angle θ advantageously mitigates sand compaction that may interfere with operations to maintain the interior components (not shown) of the rising section 600. Each instance of the rising section 600 discharges into an elbow 602 running horizontally to a discharge manifold 604. A pair of isolation valves 606, 608 may be selectively opened and closed to isolate an inlet 610 and an outlet 612 so that maintenance operations may be performed on one of the strainer tubes 128, 130 while permitting continued operation of the straining system 100 through other ones of the strainer tubes 128, 130. The isolation valves 606, 608 include the isolation valve 606 upstream of the rising section 600 together with contents (not shown) of the flow pathway therein, and the isolation valve 608 downstream of the rising section 600. A cap 614A at the uppermost extremity of the rising section 600 normally seals an access port 616 and may be selectively removed to open the access port 616 for maintenance operations including, for example, the removal of captured debris. As shown in FIG. 2, caps 614B, 614C and 614D are identical to cap 614A.

Returning to FIG. 1, the discharge manifold 604 has an interior discharge plenum 132 in fluidic communication with the respective ones of elbows 602A, 602B (see also FIG. 5) from each of the strainer tubes 128, 130. The discharge plenum 132 discharges into several four inch discharge valves, such as discharge valves 134, 136, 138 that may be selectively opened and closed for control of frac fluid flow in discharge lines 140, 142, 144 that supply an array of hydraulically connected frac pumps 146 for use in fracking operations on a wellhead 147 as are known to those of ordinary skill in the art. A gantry 148 extends over the discharge manifold 604 and facilitates access to the caps 614 for maintenance purposes. A first pressure gauge 150 monitors the pressure inside the intake plenum 104, and a second pressure gauge 152 monitors the pressure inside the discharge plenum 132.

FIG. 2 shows the rock straining system 100 mounted on a skid 210 with support legs 212, 214, 216, 218, 220, 222 rising to support various elements of the rock straining system 100 discussed above.

Figure 7:
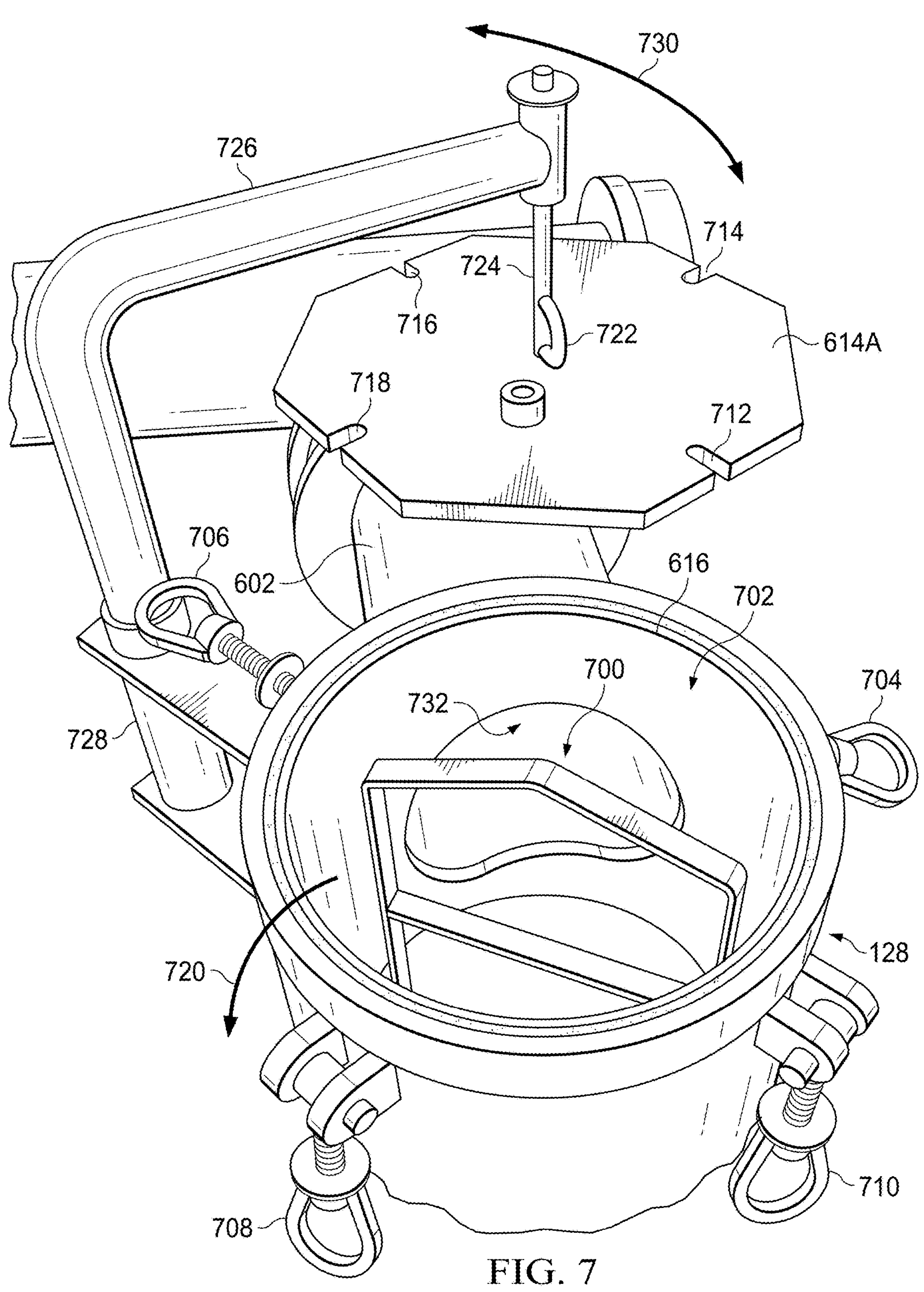
FIG. 7 shows a strainer tube of the straining system that has been opened for maintenance operations according to one embodiment.

FIG. 7 shows, by way of example representative of all strainer tubes, the strainer tube 128 with the cap 614A removed from a position of sealing engagement atop the access port 616 to reveal a mesh basket 700 located in an interior space 702. To remove the cap 614A, thumbscrew assemblies 704, 706, 708, 710 have been loosened from corresponding slots 712, 714, 716, 718 from which they have been disengaged by downward pivoting motion 720. As shown in FIG. 7, a clevis 722 is attached to the cap 614A, which hangs on a hook 724 for support after the cap 614A is removed from the access port 616. The hook 724 extends from a 90° arm 726 having an end remote from the hook 724 that is telescopingly received in a tubular support member 728 such that the 90° arm 726 is manually pivotable in a horizontal arc 730 permitting removal of the cap 614A for operations to maintain the mesh basket 700. As shown in FIG. 7, an inlet 732 communicates frac fluid from the elbow 602 to the interior space 702 so that the mesh basket 700 strains the frac fluid for removal of debris.

Figure 8:
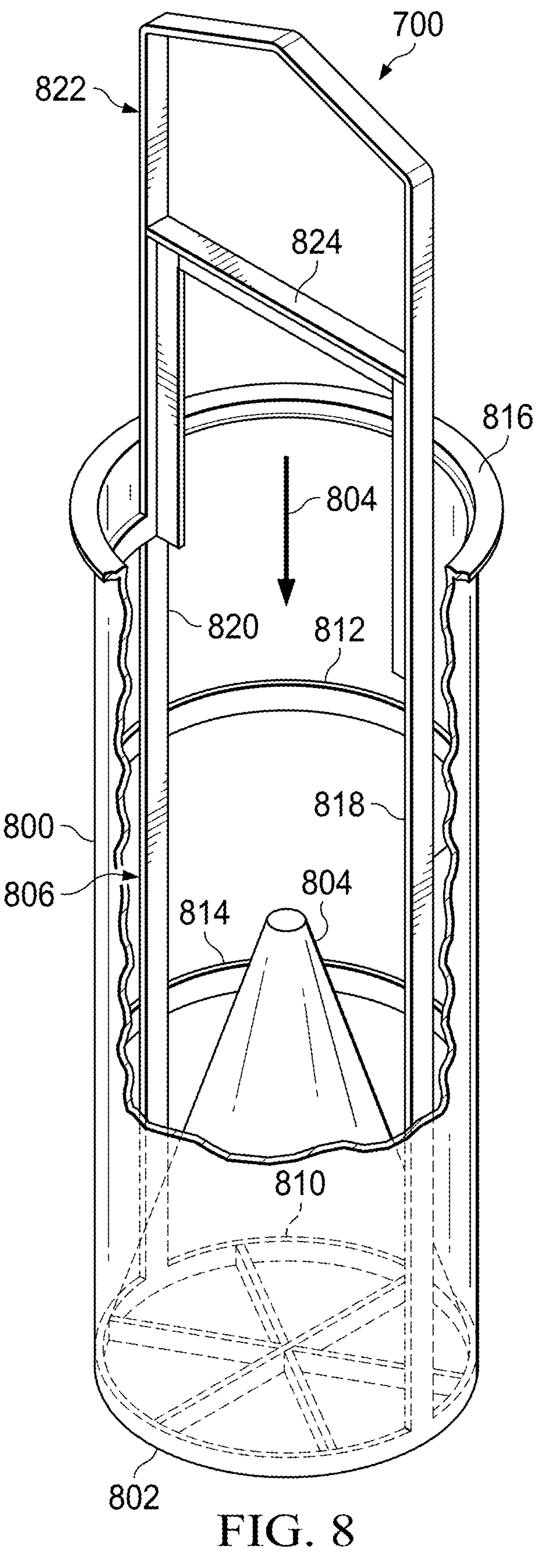
FIG. 8 shows a mesh strainer basket according to one embodiment.

FIG. 8 shows additional detail of the mesh basket 700 according to one embodiment. A radially outboard screen wall 800 has a mesh size that is capable of removing debris having an average particle size ranging up to 0.25 inch. This size is selected because experience has shown that larger mesh sizes tend to permit the passage of particles that interfere with the proper operation of valve assemblies in most commercial frac pumps in current use. Smaller mesh sizes are preferred because different types of debris encountered in the intended environment of use may have nonuniform dimensions capable of passing through the mesh in circumstances where one dimension, but not another dimension, may exceed the approximate upper limit of 0.25 inches. Accordingly, a mesh size capable of excluding particles having an average particle size of about 3⁄16 inch is preferred—roughly equating to a US Mesh size of 4. On the lower end, the mesh size must not be so small as to remove entrained proppant such as sand which, generally speaking, has a US mesh size ranging from 8 and 140 mesh (106 μm to 2.36 mm). Thus, the lower limit for mesh size preferably permits the passage of debris having an average particle size of less than 0.1 inch but this may vary depending upon the nature of the proppant in use.

As shown in FIG. 8, the screen wall 800 has a uniform diameter but, alternatively, may form a frustoconical shape tapering in a downstream direction The screen wall 800 has a bottom end 802 forming the base of an upwardly rising cone 804 tapering in an upstream direction opposite the downstream flow 804 of frac fluid from the inlet 732 (see FIG. 7). The screen wall 800 is mounted on a support frame 806 that includes a plurality of horizontal-plane rings 810, 812, 814 topped by a collar 816. One or more vertical members 818, 820 connect the horizontal-plane rings 810-814 and the collar 816 to strengthen the support frame 806 against tensile forces that occur when a handle 822 is pulled upwardly to remove the mesh basket 700 from within the interior space 702. A grip bar 824 on the handle 822 provides a second gripping surface for the exertion of additional pulling force for the removal purpose, if needed for the forceful removal of the strainer basket 700 from the interior space 732 in case there is sand compaction therein tending to make difficult the removal of the strainer basket 700. The collar 816 is formed as a circular flange and has an outer diameter greater that the outer diameter of the screen wall 800.

Figure 9:
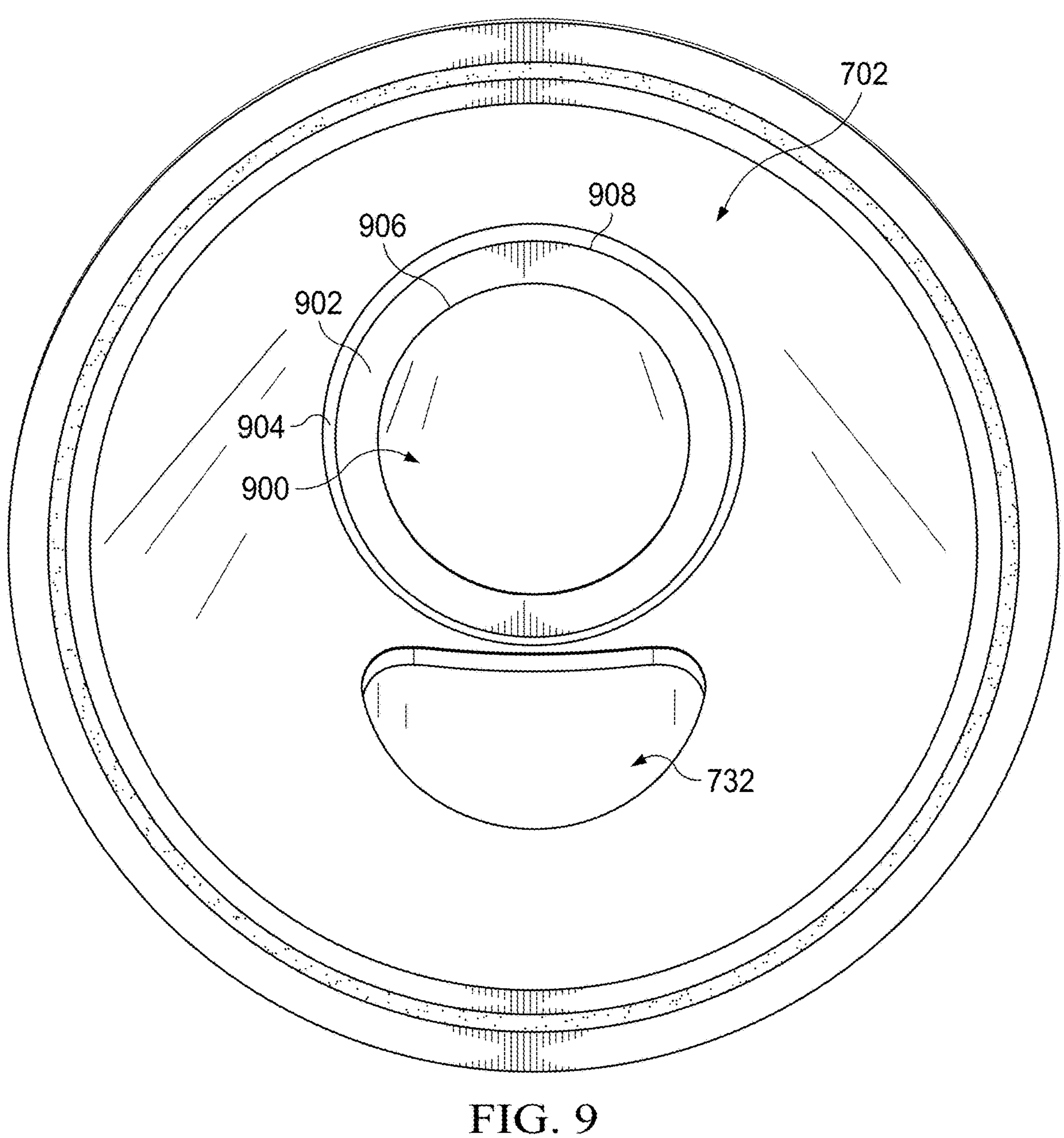
FIG. 9 shows an interior space and a strainer hanger within one of the strainer tubes that is made for receipt of the mesh strainer basket.
Figure 10:
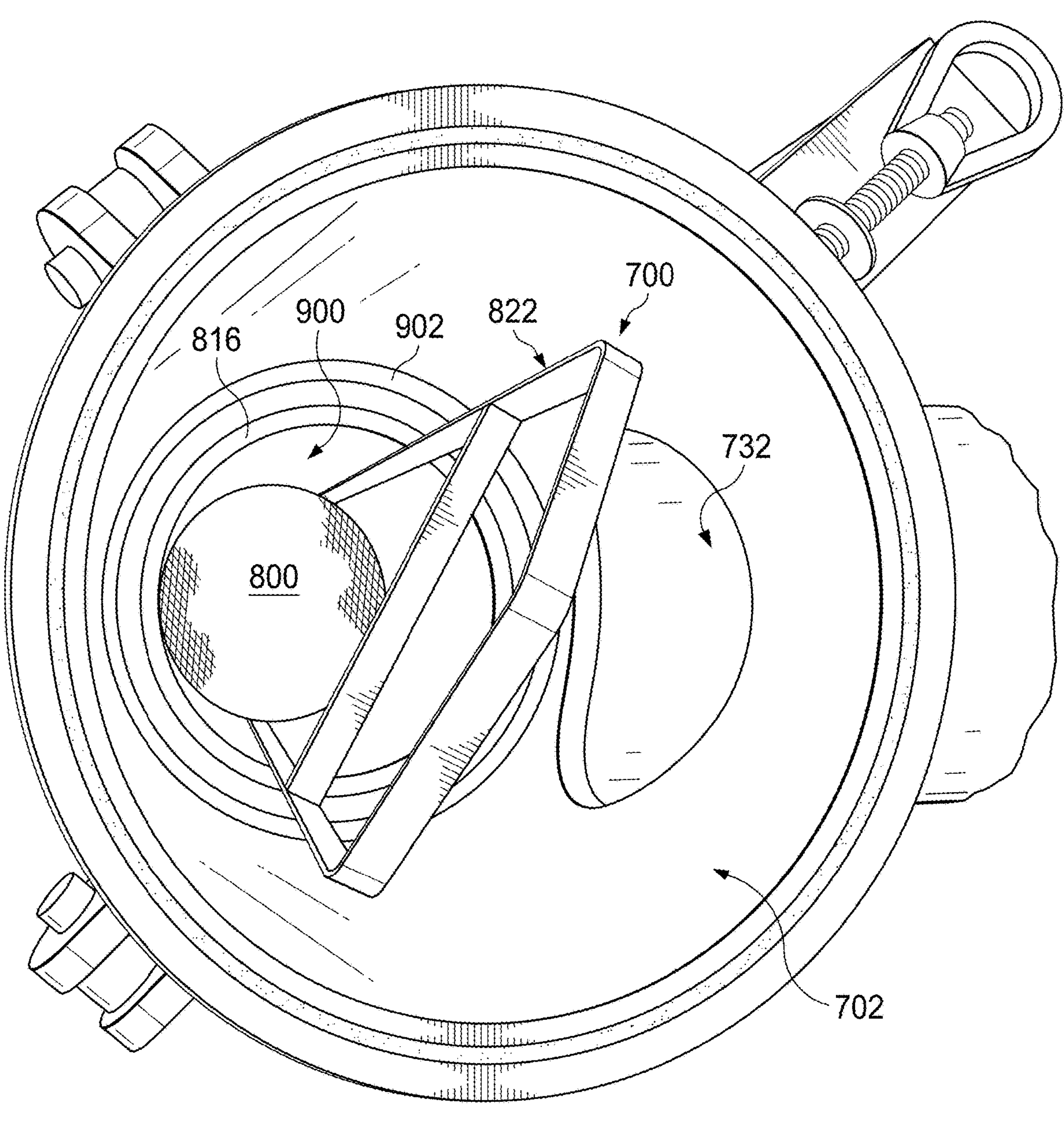
FIG. 10 shows the mesh basket received within the interior space and residing on the strainer hanger structure.

FIG. 9 shows the interior space 702, which provides a flow pathway communicating the inlet 732 with an outlet 900. The top of outlet 900 is circumscribed by an arcuate member 902, which in this embodiment is a ring or flange extending inwardly from an outer wall 904 to an inner edge 906 having a diameter permitting passage therethrough of the screen wall 800 (see FIG. 8) but not the collar 816. The arcuate member 902 may be, for example, welded to the outer wall at interface 908. Thus, the arcuate member 902 functions as a strainer-hanger for the mesh basket 700 by abutment between the arcuate member 902 and the collar 816. This is shown in FIG. 10 where the collar 816 of mesh basket 700 is seated atop the arcuate member 902 with the screen wall 800 having passed through the arcuate member 902. The arrangement is such that all frac fluid flowing from the inlet 732 into the interior space 702 passes through the screen wall 800 for straining and removal of debris having predetermined size limits according to the mesh size of the screen wall 800 as discussed above. Maintenance is performed by pulling the handle 822 upwardly to remove the mesh basket 700 from the interior space 702. Debris that has been retained by the screen wall 800 may then be removed and the mesh basket is returned to within the interior space 702 to the position shown in FIG. 10.

In the intended environment of use, the blender 126 mixes a frac fluid that contains liquid, chemical additives such as proppant, friction reducers, viscosifiers and other chemical agents as are known to those of ordinary skill in the art. The frac fluid is transmitted from the blender 126 to the wellhead 147 through a flow pathway including flow streams 116-124 to the intake valves 106-114, through the intake plenum 104 and into the strainer tubes 128, 130 where strainer baskets 700 in each of the strainer tubes 128, 130 are sized to remove unwanted elements of entrained debris from the frac fluid. The strained frac fluid next enters the discharge plenum 132, exiting the discharge valves 134, 136, 138 into discharge lines 140, 142, 144. At this point, the pressure is attributable to that of a conventional blender discharge pressure. The frac fluid enters the frac pump array 146 and exits the frac pump array 146 at a pumping pressure that is suitable by design for fracking a subterranean formation in fluidic communication with the wellhead 147. This pumping pressure is usually less than 15,000 psi, but in some instances may be greater than 15,000 psi according to the design of any particular hydraulic fracturing operation.

As the hydraulic fracturing operation is underway, or between sequential hydraulic fracturing operations on successive wells, the isolation valves 606, 608 are selectively opened and closed to permit removal of one or more of the caps 614A to 614D to perform maintenance operations on the respective strainer tubes 128, 130 as needed. Maintenance operations may include inspection of the respective ones of screen walls 800 to replace any of the mesh baskets 700 in which the screen walls 800 have holes, and removing trapped debris from the strainer baskets 700. In circumstances where there is no active flow through the straining system 100, the isolation valves 606, 608 may remain open to flow and all of the caps 614A to 614D may be removed for maintenance to occur at the same time.

In other circumstances where there is active flow in support of an ongoing hydraulic fracturing operation, the frac fluid from the blender 126 will be pressurized to approximately the level of the discharge pressure for the blender 126. No maintenance is required in this circumstance unless there is a pressure differential between the intake plenum 104 and the discharge plenum 132 that exceeds a predetermined threshold amount, such as a pressure differential constituting ten percent of the discharge pressure emanating from the blender 126, more than five psi, or another such pressure drop value indicating a need to maintain the strainer tubes 128, 130 as may be determined by field experience with particular types of frac fluid in the intended environment of use. Once the differential between pressure gauges 150, 152 exceeds this predetermined threshold, or upon a predetermined interval of pumping time, selected ones of the valves 606, 608 may be transiently closed to isolate one or more of the strainer tubes 128, 130. The closing of these valves permits the removal of selected ones of caps 616A to 614D while other ones of these caps are not removed and so there is continuous straining of the frac fluid in support of a hydraulic fracturing operation that is uninterrupted by the maintenance operations.

Persons of ordinary skill in the art understand that insubstantial changes may be made with respect to what is described above without departing from the scope and spirit of the invention. Accordingly, the inventors hereby state their intention to rely upon the Doctrine of Equivalents if necessary to protect their full rights in what is claimed.

We claim:

1. A straining system, comprising:

an intake manifold having an intake plenum;

a plurality of intake valves in fluidic communication with the intake plenum;

each of the intake valves being respectively moveable between a first intake valve position that is open to admit flow through the intake valve into the intake plenum and a second intake valve position that is closed to prevent flow through the intake valve into the intake plenum;

a plurality of strainer tubes;

each of the strainer tubes having a rising section that contains a capped access port, an inlet, an outlet, and a flow pathway placing the inlet in fluidic communication with the outlet, the inlet being in fluidic communication with the intake plenum;

the flow pathway extending in a downstream direction from the inlet towards the outlet and through at least the rising section, the flow pathway including a strainer hanger and a strainer basket located between the inlet and the outlet; and a discharge manifold having a discharge plenum;

the outlet of each strainer tube being in fluidic communication with the discharge plenum for delivery of flow thereto;

the discharge manifold having a plurality of discharge valves in fluidic communication with the discharge plenum;

each of the discharge valves being respectively moveable between a first discharge valve position that is open to admit flow through the discharge valve from the discharge plenum and a second discharge valve position that is closed to prevent flow through the discharge valve from the discharge plenum; and wherein each strainer basket comprises a cone at a downstream end thereof, the cone tapering in an upstream direction from the downstream end; and wherein each strainer hanger of the plurality of strainer hangers includes at least one arcuate member with a radially outboard side welded to an interior diameter of the rising section, a radially inboard diameter of the arcuate member permitting passage therethrough of a corresponding one of the plurality of strainer baskets.

2. The straining system of claim 1, wherein the plurality of intake valves comprises a combination of intake valves having different internal diameters.

3. The straining system of claim 2, wherein the different internal diameters are a combination of internal diameters selected from four inch valves and eight inch valves.

4. The straining system of claim 2, wherein the plurality of discharge valves comprises a combination of discharge valves having different internal diameters.

5. The straining system of claim 4, wherein different internal diameters are a combination of internal diameters selected from four inch valves and eight inch valves.

6. The straining system of claim 1, wherein each strainer tube of the plurality of strainer tubes is formed as an elbow, the elbow having a horizontal section transitioning in the downstream direction from the rising section towards the discharge manifold, and the rising section rising from horizontal at an angle of 90°+/−5°.

7. The straining system of claim 6, further comprising a gantry positioned above the discharge manifold and each one of the horizontal sections of the plurality of strainer tubes.

8. The straining system of claim 1, wherein the capped access port of each strainer tube is located at an upper end of the rising section above the inlet, the capped access port having a compressively-sealing cap that is selectively removable, the strainer basket being of dimensions permitting passage of the strainer basket through the capped access port when the cap is removed.

9. The straining system of claim 8, further comprising means for isolating a selected one of the plurality of strainer tubes for maintenance operations while frac fluid is flowing through the straining system.

10. The straining system of claim 9, wherein the means for isolating comprises a pair of valves comprising:

a first valve located in the selected one of the plurality of strainer tubes at a location upstream of the strainer basket; and a second valve located in the selected one of the plurality of strainer tubes at a location downstream of the strainer basket;

the first and second valves being constructed and arranged such that:

opening both of the first and second valves permits flow of frac fluid through the strainer basket when the cap is in place atop the capped access port, and closure of both of the first and second valves isolates the strainer basket from the flow of frac fluid to facilitate removal of the cap from atop the capped access port for the performance of maintenance operations to remove debris from the strainer basket.

11. The straining system of claim 8, including a system of screws mounted proximate the capped access port, the system of screws being constructed and arranged to exert a compressive force sealing the cap in position on the capped access port.

12. The straining system of claim 1, further comprising:

an intake pressure gauge operably mounted on the intake manifold to sense an intake-side pressure therein; and a discharge pressure gauge operably mounted on the discharge manifold to sense a discharge-side pressure therein:

wherein subtracting the discharge-side pressure from the intake-side pressure determines a pressure drop across the plurality of strainer tubes.

13. The straining system of claim 1 mounted as a self-supporting unit on a skid.

14. The straining system of claim 1, wherein each strainer basket includes a collar of sufficient outer diameter to engage the arcuate member at a position upstream of the arcuate member for support of the strainer basket on the arcuate member.

15. The straining system of claim 14, wherein each strainer basket includes a handle descending towards the collar and affixed thereto, the handle being configured for use in selectively lifting the strainer basket from the collar for maintenance of the strainer basket.

16. The straining system of claim 15, wherein the handle has at least two elongate members extending below the collar and at least two support rings bridging the at least two elongate members in a horizontal plane perpendicular to an elongate axis of each elongate member; and there being a screen forming a mesh basket attached to the support rings, the screen having a mesh size and disposition on the support rings that is effective for removing debris capable of interfering with operation of valves in a pump made for hydraulic fracturing.

17. The straining system of claim 16, wherein a mesh size of the screen is equal to or less than a size of US Mesh 4 (0.187 inch).

18. The straining system of claim 1, wherein the arcuate member is formed as a flange.

19. The straining system of claim 1, wherein the strainer basket comprises a mesh screen configured to remove debris from frac fluid.

20. The straining system of claim 19, further comprising a frac fluid blender in fluidic communication with the intake plenum via one or more of the plurality of intake valves.

* * * * *